United States Patent
Ekstedt et al.

(10) Patent No.: US 10,244,491 B2
(45) Date of Patent: Mar. 26, 2019

(54) SYNCHRONIZATION MODULE AND METHOD

(71) Applicant: TELEFONAKTIEBOLAGET L M ERICSSON (PUBL), Stockholm (SE)

(72) Inventors: Ulf Ekstedt, Saltsjöbaden (SE); Harry Leino, Värmdö (SE); Mats Rehnström, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 336 days.

(21) Appl. No.: 15/023,250

(22) PCT Filed: Oct. 1, 2013

(86) PCT No.: PCT/EP2013/070454
§ 371 (c)(1),
(2) Date: Mar. 18, 2016

(87) PCT Pub. No.: WO2015/048986
PCT Pub. Date: Apr. 9, 2015

(65) Prior Publication Data
US 2016/0234795 A1  Aug. 11, 2016

(51) Int. Cl.
*H04L 5/00* (2006.01)
*H04W 56/00* (2009.01)

(52) U.S. Cl.
CPC ........ *H04W 56/001* (2013.01); *H04L 5/0048* (2013.01); *H04W 56/00* (2013.01)

(58) Field of Classification Search
USPC ...................................................... 370/252
See application file for complete search history.

(56) References Cited

U.S. PATENT DOCUMENTS

| 2002/0073228 A1* | 6/2002 | Cognet | H04J 3/0644 709/236 |
| 2006/0036770 A1* | 2/2006 | Hosn | H04L 67/2819 709/248 |

(Continued)

FOREIGN PATENT DOCUMENTS

WO   2010020015 A1   2/2010

OTHER PUBLICATIONS

NF-8074i Specification for SFP (Small Formfactor Pluggable) Transceiver, SFF Committee, Rev 1.0, May 12, 2001.

(Continued)

*Primary Examiner* — Afsar M Qureshi
(74) *Attorney, Agent, or Firm* — Patent Portfolio Builders, PLLC

(57) ABSTRACT

A pluggable synchronization module comprises an antenna input, a Global Navigation Satellite System receiver, an electrical interface and processing circuitry. The Global Navigation Satellite System receiver is operative to receive satellite-transmitted signals comprising positioning-related information over the antenna input. The Global Navigation Satellite System receiver is further operative to determine a time reference from received positioning-related information and to provide a time reference signal according to the determined time reference. The electrical interface supports communication with the pluggable synchronization module. The electrical interface is a form-factor pluggable interface. The processing circuitry is connected to the Global Navigation Satellite System receiver and to the electrical interface. The processing circuitry is operative to deduce synchronization information from the time reference signal and to transmit the deduced synchronization information over the electrical interface.

21 Claims, 8 Drawing Sheets

(56) References Cited

U.S. PATENT DOCUMENTS

| | | | | |
|---|---|---|---|---|
| 2010/0037228 A1* | 2/2010 | Wilianto | ............... | G06F 9/4881 |
| | | | | 718/103 |
| 2010/0073228 A1 | 3/2010 | Smith | | |
| 2013/0324173 A1* | 12/2013 | Jarleholm | ............. | H04W 56/00 |
| | | | | 455/502 |
| 2014/0145875 A1* | 5/2014 | Hann | ................... | H04W 56/00 |
| | | | | 342/352 |

OTHER PUBLICATIONS

Common Public Radio Interface (CPRI); Interface Specification, V5.0, Sep. 21, 2011.
IEEE Standard for a Precision Clock Synchronization Protocol for Networked Measurement and Control Systems, IEEE Instrumentation and Measurement Society, IEEE Std 1588-2008 (Revision of IEEE Std 1588-2002), Jul. 24, 2008.

* cited by examiner

SYNCHRONIZATION MODULE AND METHOD

This application is a 371 of International Application No. PCT/EP2013/070454, filed Oct. 1, 2013, the disclosure of which is fully incorporated herein by reference.

TECHNICAL FIELD

The proposed technology generally relates to coordination of network elements and in particular to methods and devices for enabling synchronization of network elements.

BACKGROUND

Most telecommunication systems of today are based on a cellular concept, where communication with a user equipment (UE) within a certain geographical area can be provided with a base station (BS), in some contexts also referred to as a nodeB or an enodeB. In early systems, it was common to divide the radio resources between base stations within interfering distances and each base station could more or less control their own traffic independently of other traffic. However, in recent systems, the overlap of the coverage areas of the different base stations has increased, e.g. by introducing BSs of different "magnitudes". It has also been more common to allow one and the same UE to simultaneously communicate with more than one BS.

Such configurations have put demands on the BSs to be synchronized in time with each other. If one UE is expected to be able to communicate with more than one BS simultaneously, the different nodes have to operate at a common time scale. One possible approach is to establish a communication between all BSs in order to exchange synchronization information. However, such communication typically steals capacity from the actual load traffic.

One example of such an approach can be found in e.g. the published patent application US 2008/0101514 A1, in which a method and an arrangement for synchronization are disclosed. The disclosure described transferring in a digital data transfer system of timing messages within control data carried in a protocol data unit.

Well synchronized BSs can also be used for positioning purposes. User Equipments may be localized, e.g. for emergency situations, utilizing radio signaling characteristics from different BSs. Requirements in the US demand that 67% of all calls should be possible to localize within 100 m and 95% within 300 m. Some of the positioning methods require synchronization between the different BSs. The traveling time over 100 m for a radio signal is 330 ns, which gives a hint of what degree of synchronization is required.

Synchronization and exact knowledge of time is also used in other areas, such as remote sensors, finance industry and electrical power distribution.

Another possibility to achieve synchronization is to rely on information available through different types of Global Navigation Satellite Systems (GNSS). See e.g. "Understanding GPS: Principles and Applications, E. D. Kaplan (ed.), Artech House, 1996, sect. 2.7-2.7.3, pp. 54-56. Such a system comprises a number of, typically earth stationary, satellites that are positioned at well known positions and that are operating together with a well-known synchronization. The satellites transmit signals that are possible to receive at the earth. By having knowledge of the arriving times of a number of signals from different satellites, triangulation processes can be performed in order to calculate a position of the receiving node, based on information about the positions of the satellites and the transmission times according to the synchronized satellite time. If the receiving node itself is not a-priori synchronized, also this can be computed if signals from a sufficient number of satellites are detectable. A possibility to obtain synchronization between different units and nodes in a communication system is to let each of the units synchronize relative a GNSS time.

So far, three approaches of implementation of GNSS-based synchronization have been discussed. All three solutions can be based on discrete components or assembled modules. The most straight-forward approach is to provide a GNSS receiver built-in within each network element. However, such a solution is relatively inflexible. Since the GNSSs develop fast, new systems as well as updated functions and signaling protocols are expected to come. A built-in GNSS receiver is then difficult or at least expensive to update. Furthermore, a dedicated GNSS antenna port has to be provided. In cases where the synchronization is provided by other means, such GNSS receiver and antenna port will be unutilized.

Another solution is to locate the GNSS receiver at or in close proximity of the GNSS antenna. Synchronization signals are then transmitted to the network element, typically using a dedicated port, which typically cannot be used for other purposes if GNSS synchronization is not used. The GNSS receiver operation is also restricted to signals from one single GNSS antenna. Since the GNSS receiver is positioned at the antenna, mounting as well as updating procedures may also be troublesome.

It is also feasible to provide a stand-alone GNSS receiver somewhere between the GNSS antenna and the network element that needs the synchronization. However, since space often is optimized in and close to network elements, it is often troublesome to obtain a compact site installation. Also here, dedicated ports are used for synchronization signals, which ports typically cannot be used for other purposes if GNSS synchronization is not used.

SUMMARY

It is an object to provide devices and methods for providing synchronization that are more flexible than prior art solutions. This and other objects are met by embodiments of the proposed technology. The above object was achieved by devices and methods according to the enclosed independent claims. Preferred embodiments are defined by the dependent claims.

In general words, in a first aspect, a pluggable synchronization module comprises an antenna input, a Global Navigation Satellite System receiver, an electrical interface and processing circuitry. The Global Navigation Satellite System receiver is operative to receive satellite-transmitted signals comprising positioning-related information over the antenna input. The Global Navigation Satellite System receiver is further operative to determine a time reference from received such positioning-related information and to provide a time reference signal according to the determined time reference. The electrical interface supports communication with the pluggable synchronization module. The electrical interface is a form-factor pluggable interface. The processing circuitry is connected to the Global Navigation Satellite System receiver and to the electrical interface. The processing circuitry is operative to deduce synchronization information from the time reference signal and to transmit the deduced synchronization information over the electrical interface.

In a second aspect, a network element comprises a pluggable synchronization module according to the first aspect.

In a third aspect, a method for providing synchronization information comprises receiving, in a pluggable synchronization module, of satellite-transmitted signals comprising positioning-related information according to a Global Navigation Satellite System over an antenna input. A time reference is determined in the pluggable synchronization module from received such positioning-related information. A time reference signal is provided in the pluggable synchronization module according to the determined time reference. Synchronization information is deduced in the pluggable synchronization module from the time reference signal. The deduced synchronization information is transmitted over an electrical interface. The electrical interface is a form-factor pluggable interface.

One advantage of the proposed technology is that synchronization can be obtained with a large flexibility. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

As used herein, the term "wireless device" may refer to a User Equipment, UE, a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a portable electronic radio communication device, a sensor device equipped with radio communication capabilities or the like. In particular, the term "UE" should be interpreted as a non-limiting term comprising any device equipped with radio circuitry for wireless communication according to any relevant communication standard.

As used herein, the term "radio network node" or simply "network node" may refer to base stations, network control nodes, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, and even radio control nodes controlling one or more Remote Radio Units, RRUs, or the like.

As used herein, the term "network element" may refer to an entire or a part unit of a network node. In particular, the term "network element" may encompass different types of units in or constituting a radio base station including a router or server, different kinds of radio equipment, a radio control equipment, a switch, or the like.

Figure 1:
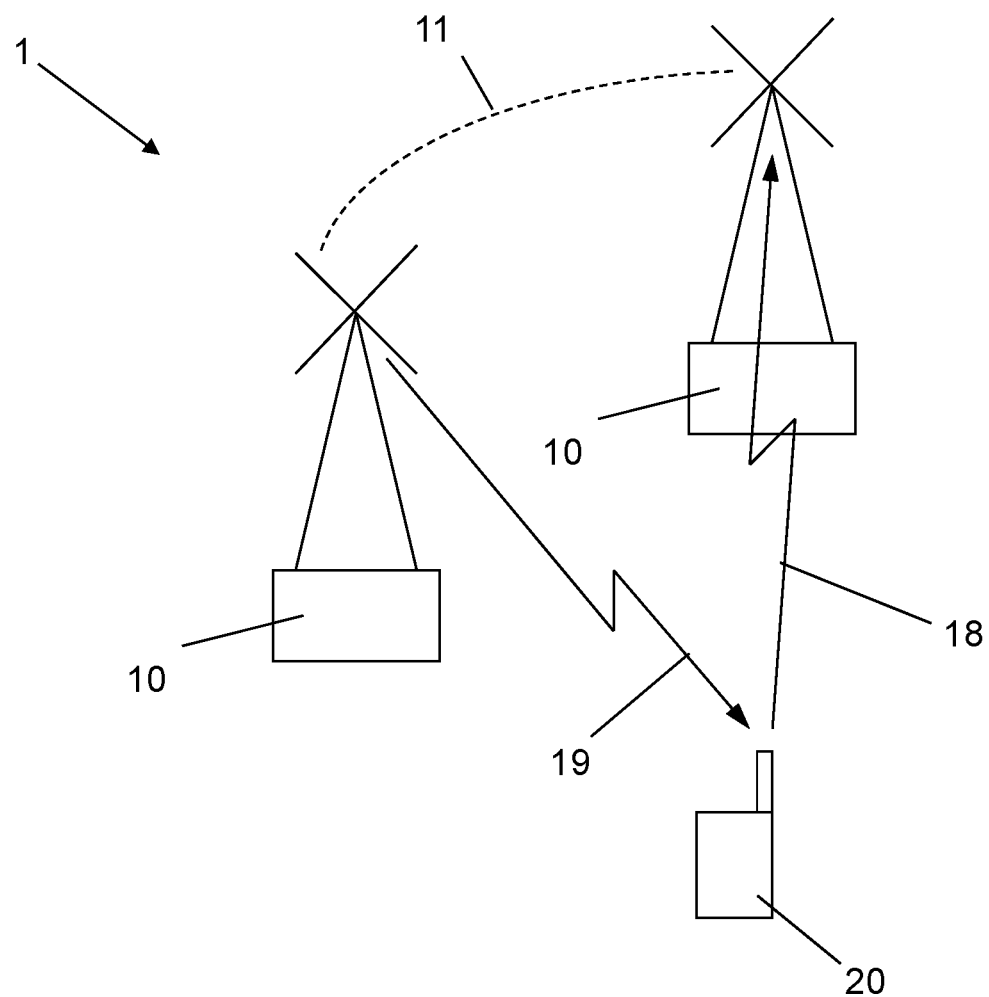
FIG. 1 illustrates a part of a telecommunication system lacking internal synchronization.

FIG. 1 illustrates a part of a telecommunication system 1 lacking internal synchronization. Two base stations 10 are in communicational contact with a UE 20. The telecommunication system is arranged for changing a radio resource from uplink traffic to downlink traffic at a certain time. However, the base stations 10 are not synchronized. When one of the base stations provides a downlink signal 19, the other base station does still utilize the same radio resource for uplink signalling 18. This is a situation that the UE cannot handle. A mutual synchronization, illustrated by the broken line 11, between the base stations 10 is necessary. Desirable synchronization levels are typically in the order of 70-100 ns.

For a better understanding of the proposed technology, it may be useful to begin with a brief overview of systems providing positioning utilizing satellite-transmitted signals, so-called Global Navigation Satellite Systems (GNSS). In particular, the term GNSS may refer to the Global Positioning System (GPS), the global navigation system of the European Union "Galileo", the Russian global navigation system GLONASS, the People's Republic of China's regional system Beidou, the People's Republic of China's global system COMPASS, India's regional navigation system—IRNSS, or the Japanese regional system QZSS, or the like.

GPS is today used on many telecommunication nodes to provide exact frequency and time-of-day. Some Cellular standards (e.g. CDMA2000) do even require timing from GPS in order to synchronize transmission and reception in the air spectrum. GLONASS is also fully operational worldwide. Galileo is a global system being developed by the European Union and other partner countries and is planned to be operational by 2014 and fully deployed by 2019. Beidou is currently limited to Asia and the West Pacific. COMPASS is planned to be operational by 2020. IRNSS is planned to be operational by 2014, covering India and Northern Indian Ocean. QZSS covers Asia and Oceania.

Figure 2:
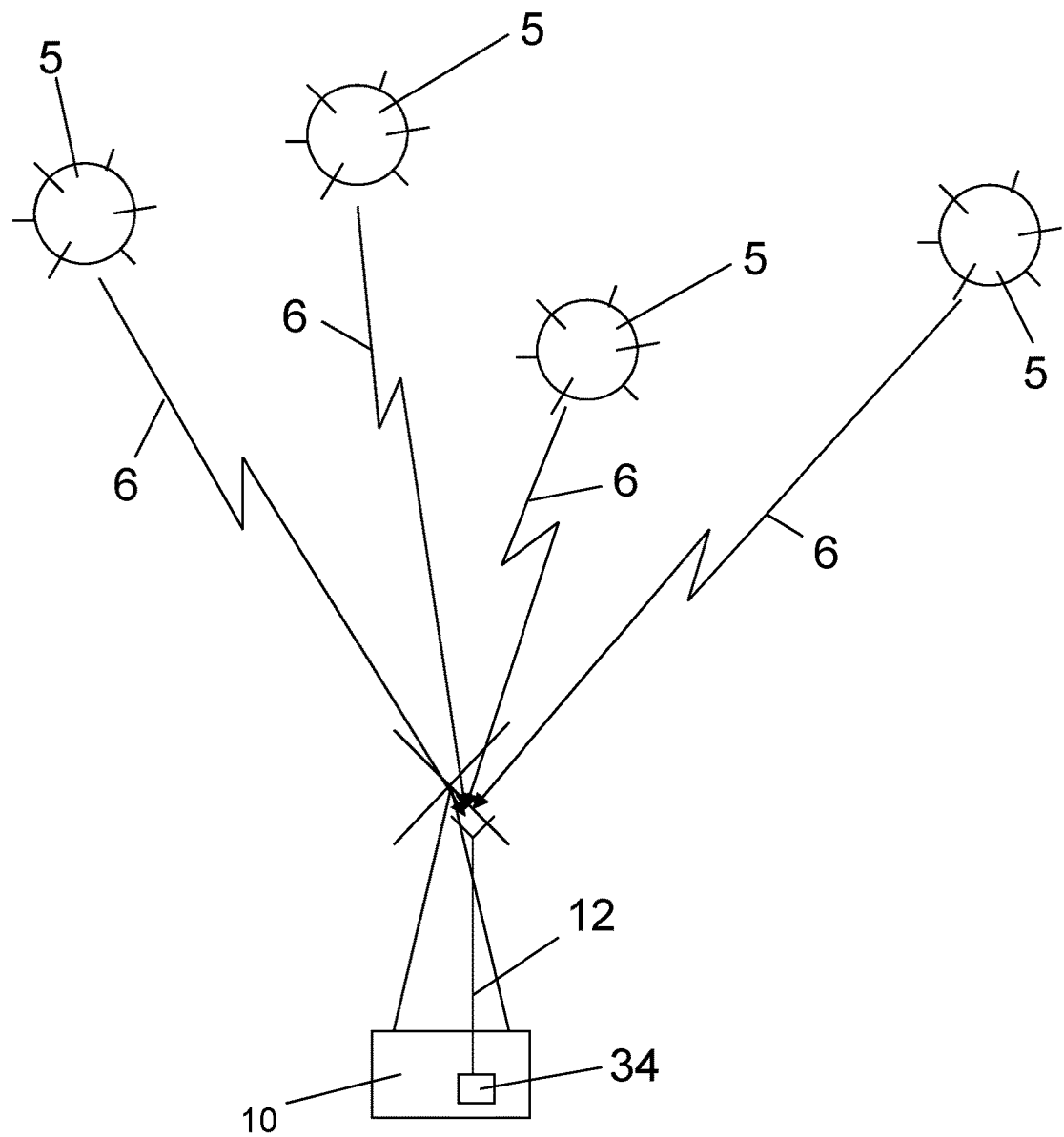
FIG. 2 schematically illustrates an embodiment of a GNSS.

An embodiment of a GNSS is schematically illustrated in FIG. 2. A number of satellites 5 are located at well-known positions. Each satellite 5 continuously transmits messages 6 that include the time the message was transmitted and the satellite position at time of message transmission. A GNSS receiver 34 receives the satellite-transmitted signals by a GNSS antenna 12 and calculates its position by precisely timing the signals sent by GNSS satellites 5 high above the Earth. In this particular embodiment, the GNSS receiver 34 is situation in connection to a base station 10. The GNSS receiver 34 uses the messages it receives to determine the transit time of each message and computes the distance to each satellite 5 using the speed of light. Each of these distances and satellites' locations define a sphere. The GNSS receiver is located on the surface of each of these spheres when the distances and the satellites' locations are correct. These distances and satellites' locations are used to compute the location of the GNSS receiver using the navigation equations. This location may then be displayed, perhaps with a map display or latitude and longitude; elevation or altitude information may be included. Many GNSS receiver units may also show derived information such as direction and speed, calculated from position changes.

If the GNSS receiver is perfectly synchronized with the satellites, typically three satellites must be visible in order to provide a positioning. In typical GNSS operation, where the synchronization is not guaranteed, four or more satellites must be visible to obtain an accurate result. Four sphere surfaces typically do not intersect perfectly. Because of this, it can be said with confidence that when the navigation equations are solved to find an intersection, this solution gives the position of the receiver along with the difference between the time kept by the GNSS receiver's on-board clock and the true time-of-day. This thereby eliminates the need for a very large, expensive, and power hungry clock. The very accurately computed time is basically used only for calculating the position, but may also be displayed. Many GNSS applications only use the location. However, a number of applications for GNSS do make use of this relatively simple and highly accurate timing. These include time transfer, traffic signal timing, and synchronization of cell phone base stations.

One type of time reference signal that may be used to mediate the synchronization information is a pulse per second signal. This time reference signal comprises a signal with a very sharp rising edge, typically with a flank accuracy of 10 ns, provided with a predetermined rate. In e.g. GPS, a one pulse per second signal is typically used, which means that once every second, the sharp rising edge signal is provided. The GNSS receiver may therefore supply the network element (NE) with a precise pulse, e.g. the 1 pulse per second (1PPS), and a data message that tells the date and time-of-day for that pulse. In GPS, this data message is denoted TxD. From such synchronization information any unit connected to the GNSS receiver can obtain synchronization.

Figure 3:
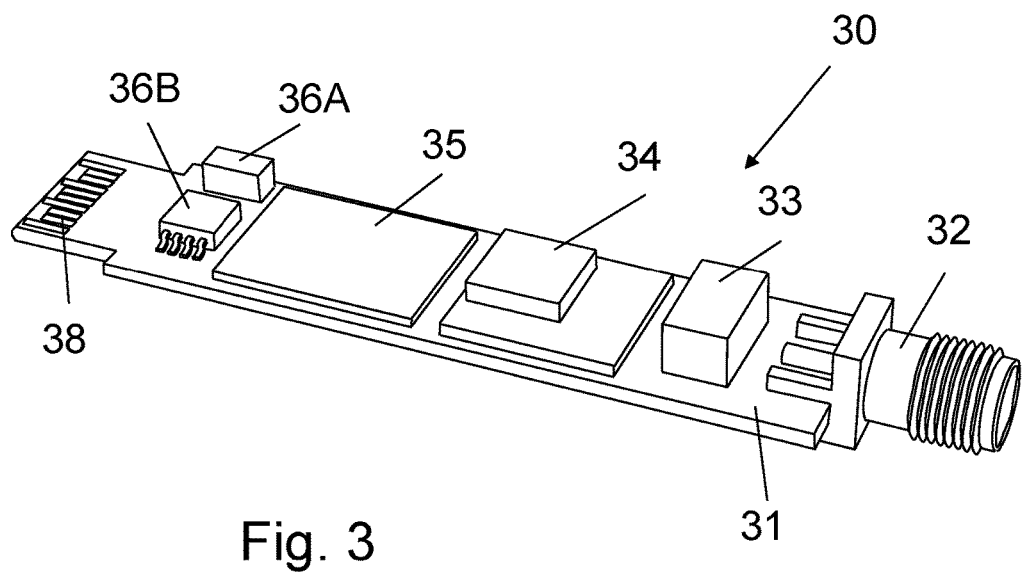
FIG. 3 illustrates a view of an embodiment of a pluggable synchronization module with the cage removed.

FIG. 3 illustrates a view of an embodiment of a pluggable synchronization module 30 (with the cage removed for displaying the content). In the present embodiment, the pluggable synchronization module 30 is a Small Form-factor Pluggable (SFP) module. The SFP is a compact, hot-pluggable transceiver typically used for both telecommunication and data communications applications. The design and operation of the form factor and electrical interface, i.e. what capabilities they have to provide, are well specified by a Multi-Source Agreement (MSA). It normally interfaces a network device motherboard (for a switch, router, media converter or similar device) to a fiber optic or copper networking cable. It is a popular industry format jointly developed and supported by many network component vendors. SFP transceivers are designed to support SONET, Gigabit Ethernet, Fibre Channel, and other communications standards. SFPs are widely used in radio base stations for both interconnecting internally within the sites and as external transmission. The pluggable synchronization module 30 is based on a circuit board 31 with a connector 38, in this particular embodiment an SFP connector.

The connector 38 provides an electrical interface supporting communication with the pluggable synchronization module 30. In the present embodiment, the electrical interface additionally feeds power to the pluggable synchronization module 30. The electrical interface is thus a form-factor pluggable interface. In the present embodiment the electrical interface is specified by the MSA.

The pluggable synchronization module 30 comprises an antenna input 32 to which a GNSS antenna cable can be attached. In this particular embodiment, the GNSS antenna is powered via the pluggable synchronization module 30 by means of antenna power units 36A and 36B. The pluggable synchronization module 30 is also provided with a crystal 33 for supporting timing functionalities. A Global Navigation Satellite System receiver 34 is provided at the circuit board 31 and is operative to receive satellite-transmitted signals comprising positioning-related information over the antenna input 32. The GNSS receiver 34 is further operative to determine a time reference from received such positioning-related information and to provide a time reference signal according to the determined time reference. This is performed according to routines, as such well-known by anyone skilled in the art. The routines are adapted for the particular GNSS that is supposed to be supported.

On many telecom sites a common GNSS antenna is used for several users. The point-of-interface is then located on Radio Frequency (RF) level with a coaxial cable and a coaxial connector, in a particular embodiment e.g. a Sub-Miniature version A (SMA) connector. An active antenna is sometimes needed when the RF cable is longer than 30 m. The Low Noise Amplifier (LNA) in the active antenna is in this particular embodiment power fed over the RF cable with a Direct Current (DC) voltage of 3 to 5 V. The power consumption is usually <0.1 W (<30 mA for 3 V).

The pluggable synchronization module 30 further comprises processing circuitry, in this embodiment in the form of a Field Programmable Gate Array (FPGA) 35 with a microprocessor, connected to the GNSS receiver 34 and to the electrical interface. The processing circuitry with the FPGA 35 is operative to deduce synchronization information from the time reference signal and to transmit the deduced synchronization information over the electrical interface. This will be described in more detail further below.

The processing could in alternative embodiments also be performed within the GNSS receiver, as will be discussed further below.

In a preferred embodiment, the pluggable synchronization module is comprised entirely within the form factor pluggable cage. A locking mechanism is preferably provided in order to hold the form factor pluggable in position. Such locking mechanisms can be designed according to various implementations, well-known as such by the person skilled in the art. The property of keeping the active components of the pluggable synchronization module within the form factor pluggable cage results in that only the cable to the GNSS antenna will appear outside the network element. The impact on the available space around the network element will therefore be very small. At the same time, since the form factor pluggable is easily removable, updating, repairing or exchanging of the pluggable synchronization module is easily performed.

In the embodiment of FIG. 3, the pluggable synchronization module is a SFP module, having a SFP interface as electrical interface. However, in alternative embodiments the solution is not limited to the SFP standard, but can be selected among any small form factor specifications, e.g. according to the specifications issued by the Small Form Factor committee. Therefore, in one alternative embodiment, the electrical interface can be a SFP+ interface, see e.g. the Small Form Factor committee specification SFF- 8431, revision 4.1, sections 2.1-2.3. In another embodiment, the electrical interface can be a XFP interface. In yet another embodiment, the electrical interface can be QSFP interface. In other words, the pluggable synchronization module can be a SFP+ module, a XFP module or a QSFP module. The standards like SFP+, XFP, QSFP therefore also apply well to this concept. Mechanical specifications are e.g. found in to the Small Form Factor committee specification SFF-8432, revision 5.1, sections 3-6.

The today commonly used RS232 or RS-422 interface adds extra noise since neither the cables nor the interface circuits are made to cope with 10 ns accuracy.

The present ideas provide for a small simple pluggable synchronization module that has a large flexibility in terms of location. It can for instance be placed in almost any SFP cage, thereby providing a compact site installation. The pluggable synchronization module operates well with a shared antenna configuration. The pluggable synchronization module is furthermore not tied to any particular GNSS, but can be adapted to be operative to each of them. The possibilities for upgrading or replacing are excellent. Since the pluggable synchronization module utilizes a common type of interface, several receivers can typically be provided to one and the same network element. The pluggable synchronization module will probably be relatively inexpensive to produce. Furthermore, for applications that do not need any synchronization, the pluggable synchronization module can easily be removed and give place for other types of connections, i.e. alternative uses of the network element connectors are provided. The pluggable synchronization module does also operate well with additional high-quality clocks provided out side the pluggable synchronization module.

As will be discussed further below, the concept of the present disclosure works well with Gigabit Ethernet (IEEE 1588) as well as CPRI.

Figure 4:
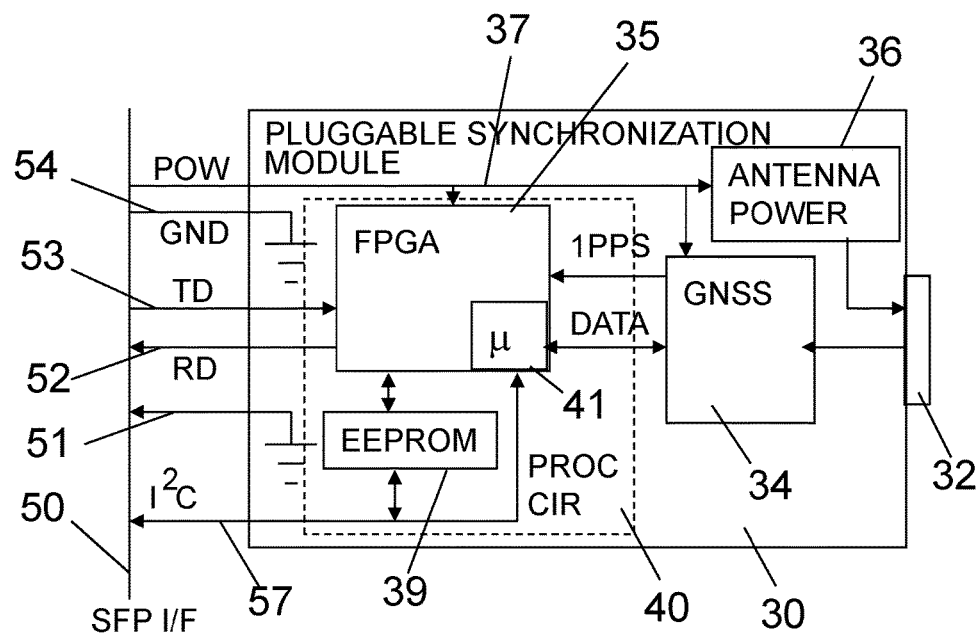
FIG. 4 illustrates a schematic illustration of an embodiment of functional modules of a pluggable synchronization module.

FIG. 4 illustrates a schematic illustration of an embodiment of functional modules of a pluggable synchronization module 30. In this embodiment, the pluggable synchronization module 30 is controlled and power fed over a SFP electrical interface 50. The pluggable synchronization module 30 provides location data as well as exact time-of-day information to the host unit/network over this SFP electrical interface 50. A power feed 37 provides power to an antenna power module 36, in turn power feeding the GNSS antenna via the antenna input 32.

A GNSS receiver 34 is connected to the antenna input 32 and is powered by the power feed 37. The GNSS receiver 34 provides in this embodiment a 1PPS signal and other time data to the processing circuitry 40. The processing circuitry 40 comprises in this embodiment a FPGA 35. The use of a FPGA 35 enables the hardware to be adapted for different modes of operation, which will be discussed further below. The FPGA 35 is provided with a microprocessor 41, which by interaction with computer executable programs routines stored in an Electrically Erasable Programmable Read-Only Memory (EEPROM) 39 can control the processing circuitry 40. In other words, the processing circuitry 40 comprises at least a processor 41 and a memory 39, wherein the memory 39 comprises instructions executable by the processor 41. In the present embodiment, an Inter-Integrated Circuit (I²C) 57 bus is connected to both the EEPROM 39 and the microprocessor 4, with different addresses. The I²C 57 connection to EEPROM 39 has the purpose of providing inventory in the same way as conventional SFP uses it. In this way the host unit can identify that this particular SFP cage is equipped with a GNSS receiver. The I²C 57 connection to EEPROM 39 can also be used for upgrading of GNSS functionality by uploading of software and FPGA code, which eventually is used for updating the FPGA 35. The I²C 57 connection to the microprocessor 41 has the purpose of configuring FPGA functionality. It also has the purpose of mapping messages from the receiver chip such as location and receiver or satellite health.

The SFP interface 50 is also configured to receive Received Data (RD) signals 52 from the FPGA 35 and provide Transmit Data (TD) signals 53 to the FPGA 35. A ground connection 54 is also provided as well as a module present indicator 51.

Figure 5:
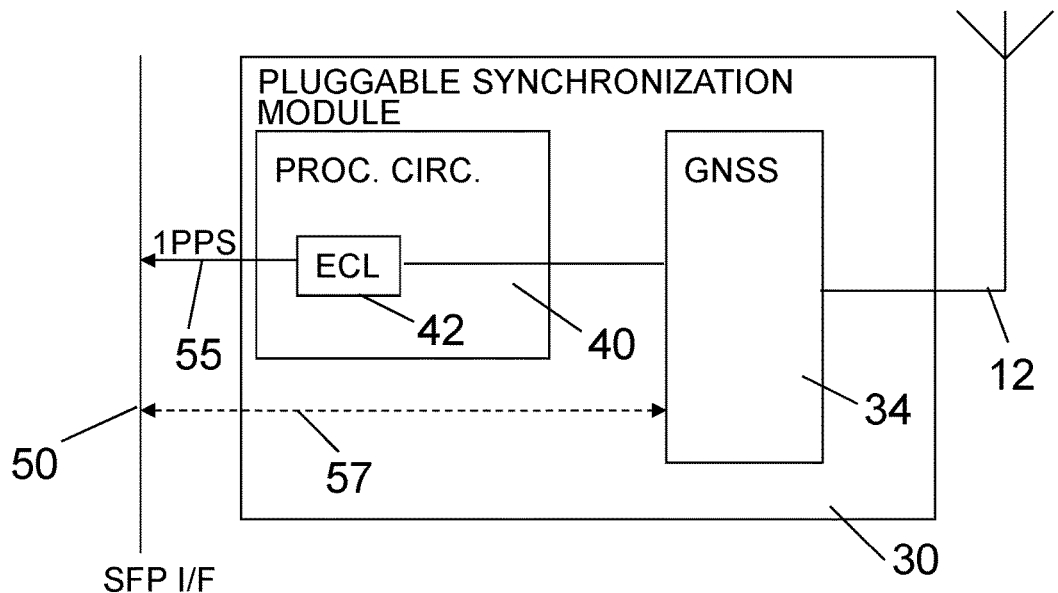
FIG. 5 illustrates an embodiment of a pluggable synchronization module.

As mentioned further above, a pluggable synchronization module according to the present disclosure may be operated in different modes. FIG. 5 illustrates an embodiment of a pluggable synchronization module 30 operative in one such mode. In this embodiment, the deduced synchronization information to be transmitted comprises the pulse per second signal, originally obtained from the GNSS receiver. The processing circuitry 40 comprises a differential interface, in this embodiment an Emitter-Coupled Logic (ECL) 42, preferably realized through a FPGA. The ECL 42 has the task to route the 1PPS signal from the GNSS receiver 34 to the RD port 52 of the SFP interface 50. The Coordinated Universal Time (UTC), e.g. the Time-of-day messages that are related to the 1PPS pulse are transmitted over the I²C 57 bus between the GNSS receiver 34 and the SFP interface 50. The host unit, e.g. a network element, then uses the 1PPS signal and the Time-of-day data in a traditional way.

Figure 6:
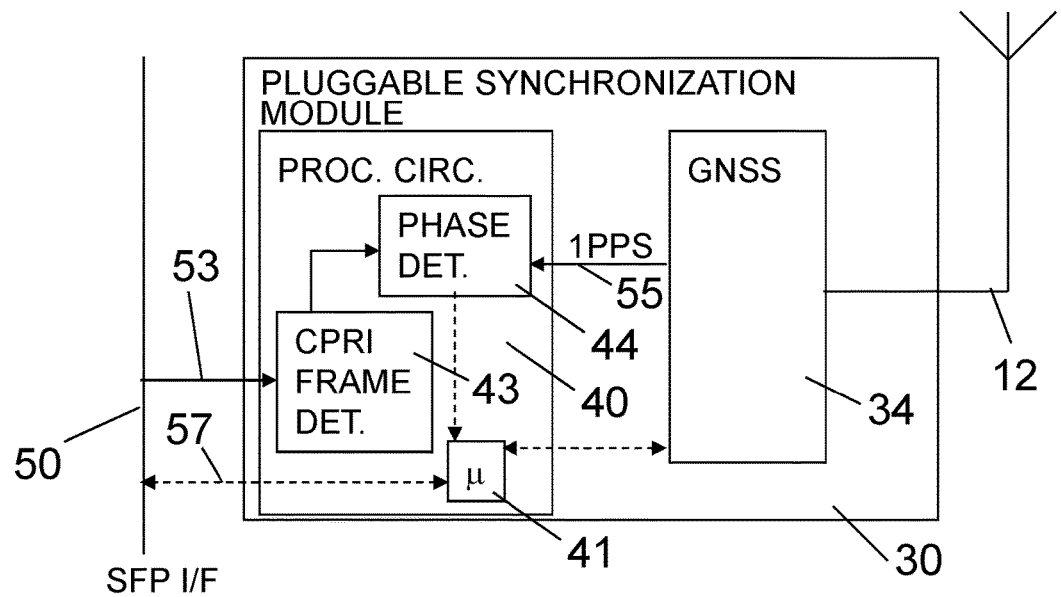
FIG. 6 illustrates another embodiment of a pluggable synchronization module.

FIG. 6 illustrates another embodiment of a pluggable synchronization module 30 operative in another mode. The processing circuitry 40 is in this embodiment further operative to receive external time reference information from a host unit over the electrical interface. Furthermore, the processing circuitry 40 is in this embodiment further operative to obtain a synchronization deviation information by comparing the external time reference information received over the electrical interface with the time reference signal provided by the GNSS receiver 34. Thereby, the deduced synchronization information to be transmitted comprises the synchronization deviation information. In the present embodiment, the external time reference information comprises Common Public Radio Interface (CPRI) frames.

The pluggable synchronization module 30 does in this embodiment take work as CPRI slave. Preferably, it works on all defined CPRI rates from 614 Mb/s to 10.1 Gb/s. The CPRI standard defines that the masters should continuously send out CPRI frames and this means that the pluggable synchronization module 30 could be a pure listener and only a portion of the full CPRI protocol therefore need to be implemented in the pluggable synchronization module 30. The CPRI frames are obtained by means of a stable oscillator and therefore provide a stable clock and time of the day.

The processing circuitry 40 comprises here a CPRI frame detector 43, e.g. connected to the TD port 53 of the SFP interface 50. A phase detector 44 detects the phase of the CPRI frame and compares the CPRI phase with the 1PPS signal 55 as received from the GNSS receiver 34. The microprocessor 41 is informed about any deviation and transmits the synchronization deviation information over the I²C port 57.

The CPRI mode can be used in base stations at e.g. either the radio unit or at the digital unit. The synchronization of the system clock is done with soft synchronization as described above. In a base station the pluggable synchronization module could e.g. be placed in a combined Antenna and Radio Unit. The GNSS antenna 12 could then be built-in in the other radio antenna unit or be placed in the proximity of it. It would in any way simplify the installation since the alternative would reduce the work on site.

The CPRI frame structure has a fixed relation to UTC. It is therefore possible to derive exact UTC based on the CPRI hyper-frame as long as there is a rough idea of time, within 40.96 s, that is the period of the hyperframe. The phase detector 44 in the processing circuitry 40 simply report on what clock-cycles in the hyperframe the 1PPS occurs. A 2.5 Gb/s CPRI link has a clock-cycle period of 0.4 ns.

It is quite easy to detect the hyperframe start. All CPRI masters transmit continuously transmitting CPRI frames for enabling slaves to synch in and identify themselves. Basic frame start may be based on violation of 8b10b line code that is used in all CPRI modes up to 9.8 Gb/s. Start of Hyperframe is detected when some fields are set to zero.

Figure 7:
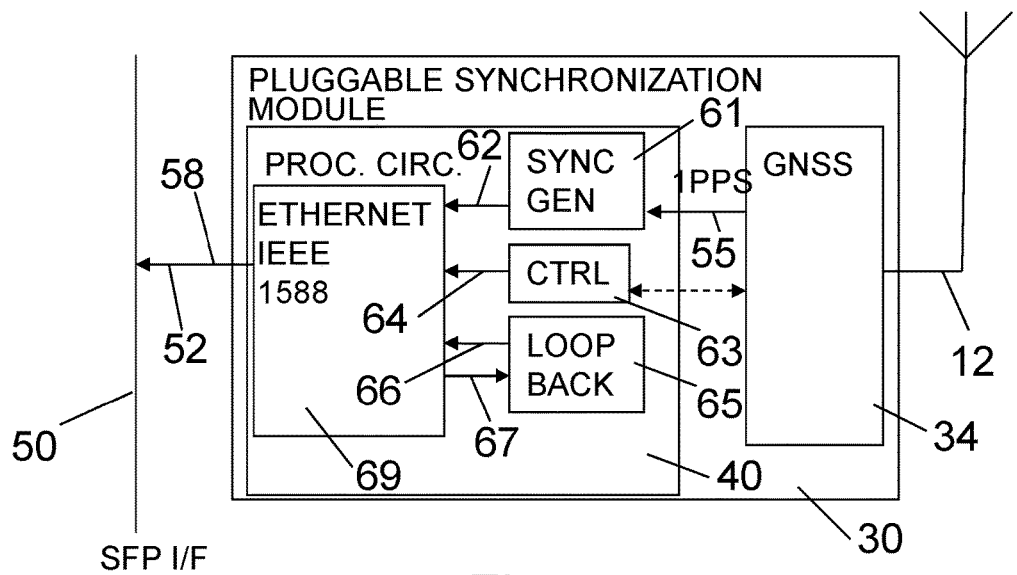
FIG. 7 illustrates yet another embodiment of a pluggable synchronization module.

FIG. 7 illustrates yet another embodiment of a pluggable synchronization module 30 operative in yet another mode. In this embodiment, the processing circuitry 40 is further operative to generate IEEE 1588 Master messages based on the time reference signal. Thereby, the transmitted synchronization information comprises the generated IEEE 1588 Master messages.

The processing circuitry 40 may comprise a 1G Ethernet link with IEEE 1588. The pluggable synchronization module 30 can both act as an IEEE 1588 Slave or Master. The Slave mode will be discussed more in detail further below, and first we concentrate on the pluggable synchronization module 30 as an IEEE 1588 master. The pluggable synchronization module 30 thereby generates IEEE 1588 messages.

This solution works on any Ethernet rate even if the 1000Base-X, Gigabit Ethernet, is the most convergent to implement. The clock resolution in the 1000Base-X ion THE SFP interface is sufficient, 1 ns, since the accuracy of the GNSS signal is seldom better than 10 ns. Note that the traditional RJ45 based Gigabit-Ethernet interface, 1000Base-TX, has a resolution of 8 ns.

The processing circuitry comprises a sync generator 61, which receives the 1PPS signal from the GNSS receiver 34. The 1PPS pulse triggers the generation of a synch( ) signal 62, provided to an Ethernet IEEE 1588 master module 69. A control module 63 is provided by information from the GNSS receiver, e.g. the time of the day. An Announce( ) message 64 with GNSS/Synch health information is provided to the Ethernet IEEE 1588 master module 69. A Delay resp( ) message 66 is generated by a loop back module 65 as a direct response on a received Delay_req( ) message 67. This is typically applicable when the request comes from another node in e.g. a local area network, where the delay may not be known. If the delay is known, as it typically is when pluggable talks with a host, the time stamping can be omitted and values based on the known delays can be use for basis of delay response. There is no need for having any precise oscillator in pluggable synchronization module 30 since it only encapsulates the 1PPS signal into a Precision Time Protocol (PTP)/Sync message. When no 1PPS is available or the quality is bad this will be handled according to the normal PTP procedures. This might cause disturbances in the network. Any network element that handles IEEE 1588 can host the pluggable synchronization module 30 without any hardware or software changes. The Ethernet IEEE 1588 master module 69 provides a master signal 58 on the RD port 52.

Figure 8:
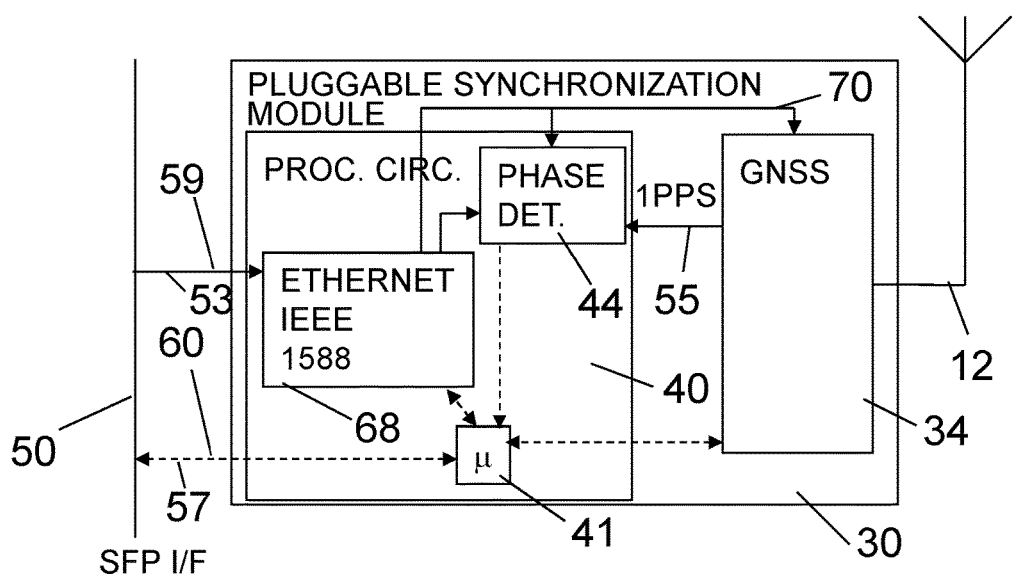
FIG. 8 also illustrates an embodiment of a pluggable synchronization module.

FIG. 8 illustrates yet another embodiment of a pluggable synchronization module 30 operative in yet another mode. Here, the pluggable synchronization module 30 acts as an IEEE 1588 slave. This approach requires some adaptation of the host unit. Also this solution works well on any Ethernet rate but with the implementation preferences of 1000Base-X. Even if the pluggable synchronization module 30 is a slave from the IEEE 1588 point of view it is a master. The principles are analogous as for the CPRI mode of FIG. 6. The master clock distributes an IEEE 1588 clock signal to the pluggable synchronization module 30 either directly or over a network. In other words, the external time reference information comprises IEEE 1588 Master messages, whereby the synchronization deviation information comprises IEEE 1588 Slave messages.

A phase detector 44 of the processing circuitry 40 in the pluggable synchronization module 30 measures the time of 1PPS pulses obtained from the GNSS receiver 34. A reference rate (e.g. 1 GHz) 70 is in this embodiment provided from the Ethernet IEEE 1588 slave module 68 to the GNSS receiver 34 and the phase detector. The measurements are based on estimated Ethernet IEEE 1588 time as obtained from an Ethernet IEEE 1588 slave module 68, which in turn receives a master signal 59 on the TD port 53. The pluggable synchronization module 30 sends synchronization deviation information 60 back to the host unit. The synchronization deviation information 60 can either be sent over I$^2$C 57 as illustrated, or over the Ethernet IEEE 1588 slave module 68 to the Master clock.

Figure 9:
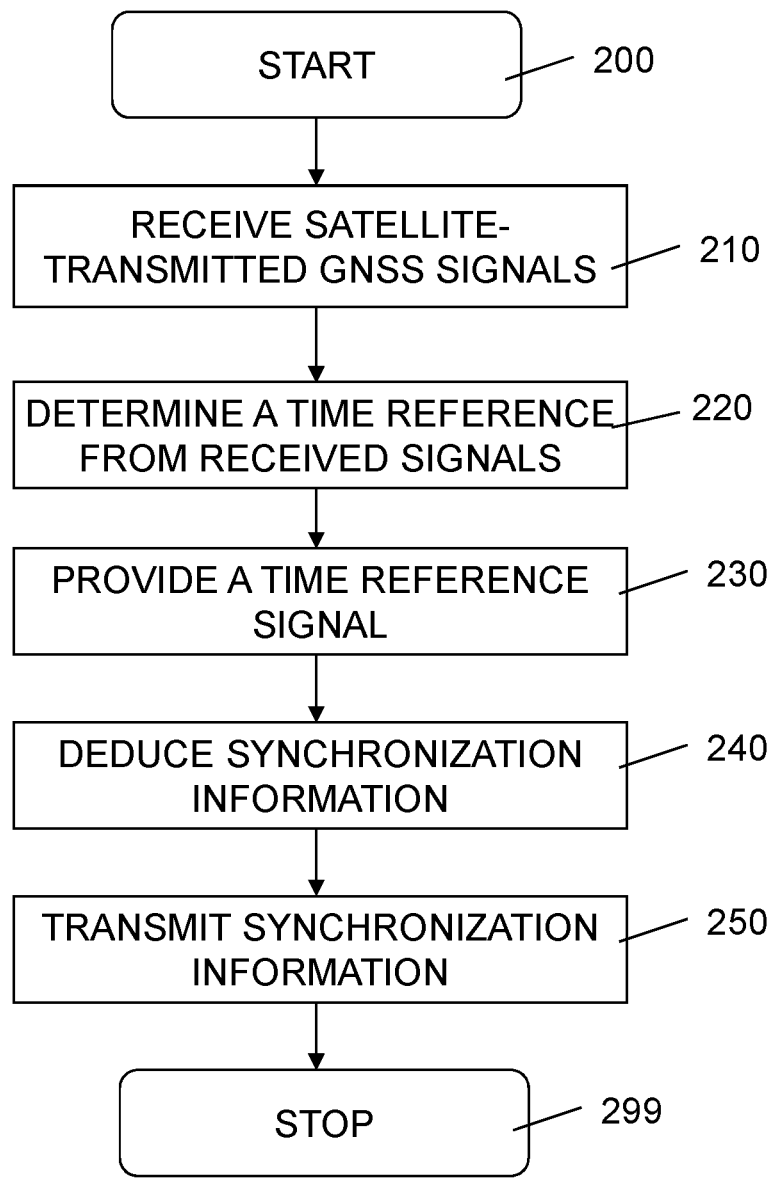
FIG. 9 illustrates a flow diagram of steps of an embodiment of a method for providing synchronization information.

FIG. 9 illustrates a flow diagram of steps of an embodiment of a method for providing synchronization information. The method for providing synchronization information starts in step 200. In step 210, satellite-transmitted signals comprising positioning-related information according to a GNSS is received in a pluggable synchronization module over an antenna input. A time reference is in step 220 determined in the pluggable synchronization module, from received such positioning-related information. In step 230, a time reference signal is provided in the pluggable synchronization module according to the determined time reference. In a particular embodiment, the step 230 of providing a time reference signal comprises providing a pulse per second signal, preferably a one pulse per second signal. Synchronization information is in step 240 deduced in the pluggable synchronization module from the time reference signal. In step 250, the deduced synchronization information is transmitted over an electrical interface. The electrical interface is a form-factor pluggable interface. As mentioned before, the different variations of form-factor pluggable interfaces are feasible. Therefore, the step 250 of transmitting the deduced synchronization information may in different embodiments comprise transmitting the deduced synchronization information over one of a SFP interface, a SFP+ interface, a XFP interface, and a QSFP interface. The process ends in step 299.

In one embodiment, the step 240 of deducing synchronization information comprises generating IEEE 1588 Master messages based on the time reference signal. Thereby, the transmitted synchronization information is constituted to comprise the generated IEEE 1588 Master messages.

In another embodiment, the step 240 of deducing synchronization information instead comprises incorporation of the pulse per second signal into the synchronization information.

Figure 10:
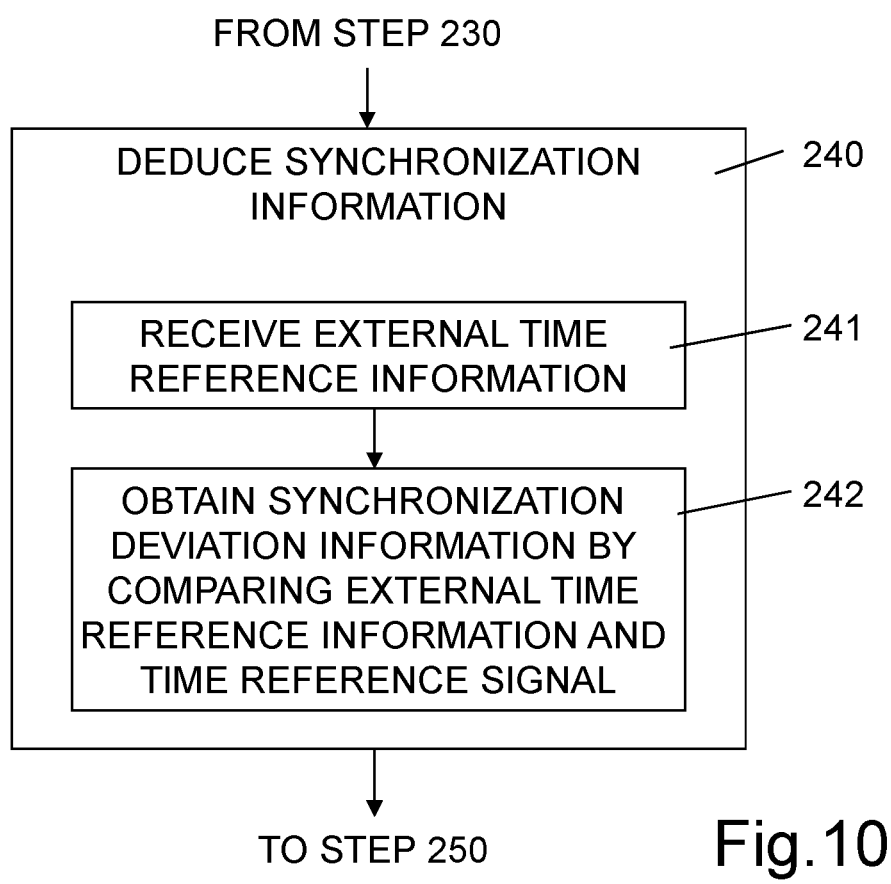
FIG. 10 illustrates a part flow diagram of part steps of an embodiment of a step of deducing synchronization information.

When the deducing of the synchronization information is made in a Slave configuration, the step 240 of deducing synchronization information comprises further parts steps. FIG. 10 illustrates a part flow diagram of part steps of an embodiment of a step 240 of deducing synchronization information. The part process starts from the step 230 of FIG. 9. In step 241, external time reference information is received over the electrical interface. In step 242, synchronization deviation information is obtained by comparing the external time reference information received over the electrical interface with the time reference signal provided by the GNSS receiver. Thereby, the deduced synchronization information to be transmitted is constituted to comprise the synchronization deviation information.

In an embodiment employing the Ethernet IEEE 1588 standard, the step 241 of receiving external time reference information comprises receiving of IEEE 1588 Master messages. Likewise, the step 242 of deducing a synchronization deviation information comprises deducing IEEE 1588 Slave messages.

In an embodiment employing a CPRI standard, step 241 of receiving external time reference information comprises receiving of CPRI frames.

It will be appreciated that the methods and devices described above can be combined and re-arranged in a variety of ways.

For example, embodiments may be implemented in hardware, or in software for execution by suitable processing circuitry, or a combination thereof.

The steps, functions, procedures, modules and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units.

The flow diagram or diagrams presented above may therefore be regarded as a whole or in part as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

Figure 11A:
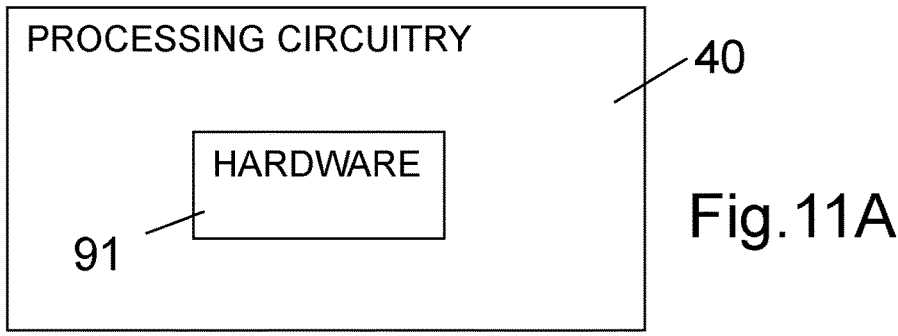
FIGS. 11A-D illustrates different implementation embodiments.

FIG. 11A illustrates schematically one embodiment of the processing circuitry 40 operative to deduce synchronization information from the time reference signal and to transmit the deduced synchronization information over the electrical interface. In this embodiment, the processing circuitry 40 is implemented as hardware 91.

Figure 11B:
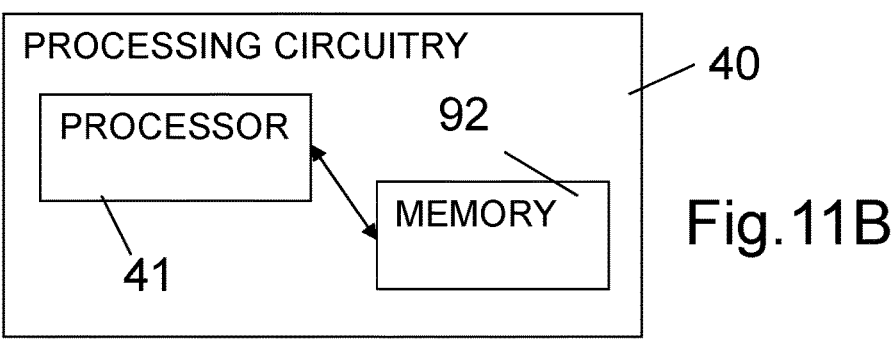

FIG. 11B illustrates schematically another embodiment of the processing circuitry 40. In this embodiment, the processing circuitry 40 is implemented by a processor 41 and a memory 92, e.g. an EEPROM. In this case, the function modules are implemented as a computer program running on the processor.

Figure 11C:
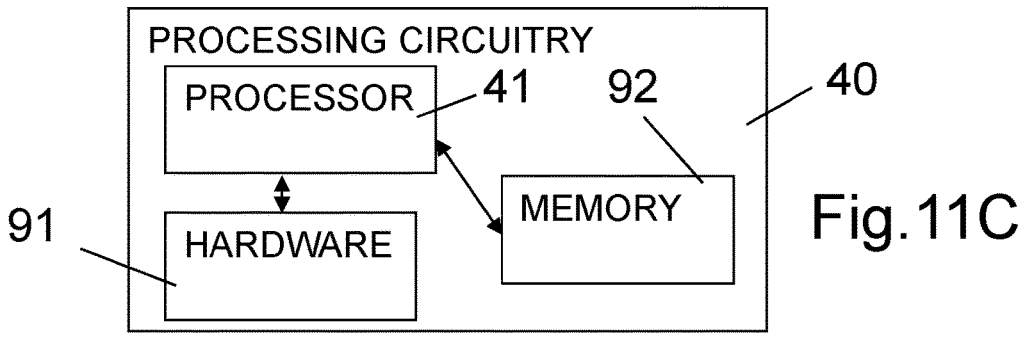

FIG. 11C illustrates schematically yet another embodiment of the processing circuitry 40. In this embodiment, the processing circuitry 40 is implemented partly by a processor 41 and a memory 92 and partly by hardware 91.

It should also be understood that it may be possible to re-use the general processing capabilities of any conventional device or unit in which the proposed technology is implemented. It may also be possible to re-use existing software, e.g. by reprogramming of the existing software or by adding new software components.

Figure 11D:
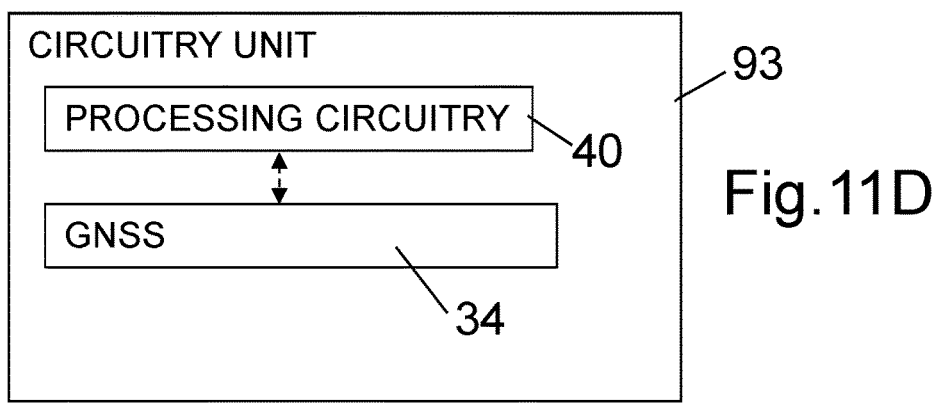

In particular, since the GNSS receiver 34 typically comprises some type of processor, there might be some possibilities to reuse processing capacity also for deducing synchronization information from the time reference signal and to transmitting the deduced synchronization information over the electrical interface. In other words, the processing for deducing synchronization information could, at least to a part, be performed already within the GNSS receiver. In FIG. 11D, a part of an embodiment of a pluggable synchronization module is schematically illustrated. A circuitry unit 93 here comprises the GNSS receiver 34 and the processing circuitry 40. The different components can here share common processing means, such as e.g. processors or memories.

The embodiments described above are to be understood as a few illustrative examples, and it should be understood that the proposed technology is not limited thereto. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A pluggable synchronization module comprising:
   an antenna input;
   a Global Navigation Satellite System receiver operative to receive satellite-transmitted signals comprising positioning-related information over said antenna input;
   said Global Navigation Satellite System receiver being further operative to determine a time reference from received said positioning-related information and to provide a time reference signal according to said determined time reference;
   an electrical interface supporting communication with said pluggable synchronization module;
   said electrical interface being a form-factor pluggable interface; and
   processing circuitry connected to said Global Navigation Satellite System receiver and to said electrical interface;
   said processing circuitry being operative to deduce synchronization information from said time reference signal and to transmit said deduced synchronization information over said electrical interface.

2. The pluggable synchronization module according to claim 1, wherein said electrical interface is one of a Small Form-factor Pluggable (SFP) interface, a SFP+ interface, a 10 Gigabit Small Form-Factor Pluggable (XFP) interface, and a Quad Small Form-Factor Pluggable (QSFP) interface.

3. The pluggable synchronization module according to claim 1, wherein said pluggable synchronization module is comprised within a form-factor pluggable cage.

4. The pluggable synchronization module according to claim 1, wherein said time reference signal is a pulse per second signal.

5. The pluggable synchronization module according to claim 4, wherein said deduced synchronization information to be transmitted comprises said pulse per second signal.

6. The pluggable synchronization module according to claim 1, wherein said processing circuitry comprises at least a processor and a memory, and wherein said memory comprises instructions executable by said processor.

7. The pluggable synchronization module according to claim 1, wherein said processing circuitry is further operative to generate IEEE 1588 Master messages based on said time reference signal, whereby said transmitted synchronization information comprises said generated IEEE 1588 Master messages.

8. The pluggable synchronization module according to claim 1, wherein said processing circuitry is further operative to:
receive external time reference information from a host unit over said electrical interface; and
deduce synchronization deviation information by comparing said external time reference information received over said electrical interface with said time reference signal provided by said Global Navigation Satellite System receiver,
whereby said deduced synchronization information to be transmitted comprises said synchronization deviation information.

9. The pluggable synchronization module according to claim 8, wherein said external time reference information comprises IEEE 1588 Master messages, whereby said synchronization deviation information comprises IEEE 1588 Slave messages.

10. The pluggable synchronization module according to claim 8, wherein said external time reference information comprises Common Public Radio Interface frames.

11. The pluggable synchronization module according to claim 1, wherein said processing circuitry comprises at least a Field-Programmable Gate Array.

12. The pluggable synchronization module according to claim 6, wherein said processing circuitry comprises a differential interface.

13. A network element comprising a pluggable synchronization module according to claim 1.

14. A method for providing synchronization information, comprising the steps of:
receiving, in a pluggable synchronization module, satellite-transmitted signals comprising positioning-related information according to a Global Navigation Satellite System over an antenna input;
determining, in said pluggable synchronization module, a time reference from received said positioning-related information;
providing, in said pluggable synchronization module, a time reference signal according to said determined time reference;
deducing, in said pluggable synchronization module, synchronization information from said time reference signal; and
transmitting said deduced synchronization information over an electrical interface, said electrical interface being a form-factor pluggable interface.

15. The method according to claim 14, wherein said step of transmitting said deduced synchronization information comprises transmitting said deduced synchronization information over one of a Small Form-factor Pluggable (SFP) interface, a SFP+ interface, a 10 Gigabit Small Form-Factor Pluggable (XFP) interface, and a Quad Small Form-Factor Pluggable (QSFP) interface.

16. The method according to claim 14, wherein said step of providing said time reference signal comprises providing a pulse per second signal.

17. The method according to claim 16, wherein said step of deducing said synchronization information comprises incorporation of said pulse per second signal into said synchronization information.

18. The method according to claim 14, wherein said step of deducing said synchronization information comprises generating IEEE 1588 Master messages based on said time reference signal, whereby said transmitted synchronization information comprises said generated IEEE 1588 Master messages.

19. The method according to claim 14, wherein said step of deducing said synchronization information comprises:
receiving external time reference information over said electrical interface; and
deducing synchronization deviation information by comparing said external time reference information received over said electrical interface with said time reference signal provided by said Global Navigation Satellite System receiver,
whereby said deduced synchronization information to be transmitted comprises said synchronization deviation information.

20. The method according to claim 19, wherein said step of receiving said external time reference information comprises receiving IEEE 1588 Master messages, and said step of deducing said synchronization deviation information comprises deducing IEEE 1588 Slave messages.

21. The method according to claim 19, wherein said step of receiving external time reference information comprises receiving Common Public Radio Interface frames.

* * * * *